Oct. 18, 1960 A. M. EVANS Re. 24,887
COLD WEATHER QUILTED GARMENT
Original Filed Dec. 24, 1958 2 Sheets-Sheet 1
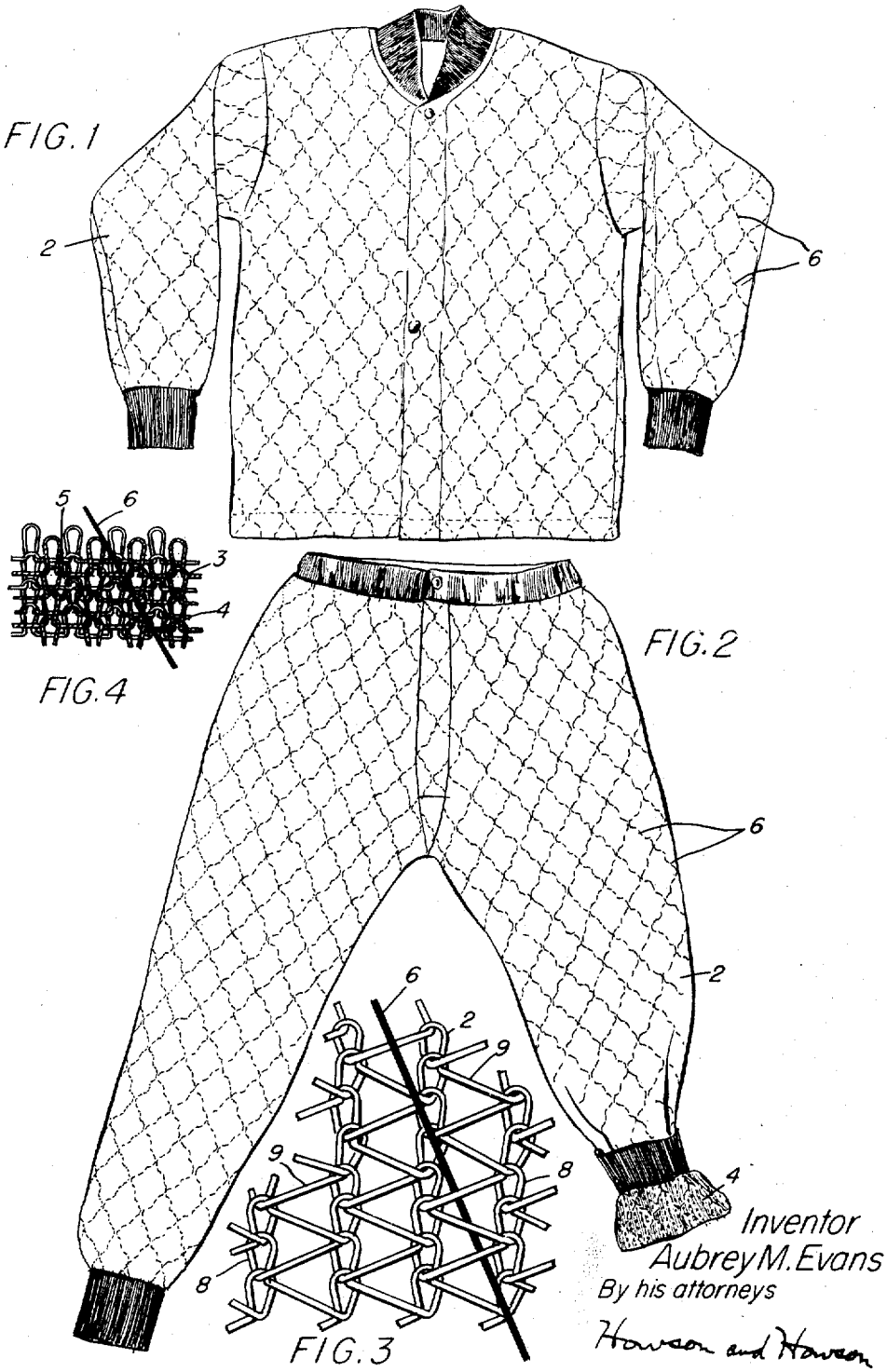
Inventor
Aubrey M. Evans
By his attorneys
Howson and Howson

COLD WEATHER QUILTED GARMENT

Original Filed Dec. 24, 1958 2 Sheets-Sheet 2

Inventor
Aubrey M. Evans
By his attorneys
Howson and Howson

United States Patent Office

Re. 24,887
Reissued Oct. 18, 1960

24,887

COLD WEATHER QUILTED GARMENT

Aubrey M. Evans, Barneveld, N.Y., assignor to Duofold, Inc., Mohawk, N.Y., a corporation of New York Original No. 2,921,457, dated Jan. 19, 1960, Ser. No. 782,952, Dec. 24, 1958. Application for reissue May 26, 1960, Ser. No. 32,065

8 Claims. (Cl. 66—176)

Matter enclosed in heavy brackets [ ] appears in the original patent but forms no part of this reissue specification; matter printed in italics indicates the additions made by reissue.

This invention relates to a cold weather [knitted] garment made of fabric having a multiplicity of layers and more particularly such a garment containing a layer of porous foam either synthetic or rubber. Cold weather garments must have the qualities of extensibility and flexibility in order to allow for the movements of the wearer. It has also been found that to get maximum value from cold weather garments, they should have ventilation to take care of perspiration. Garments have heretofore been known having three layers in which the outer layers are knitted or woven fabric, and the center layer is porous foam but the life of such garments has not been wholly satisfactory and the problem of evaporation of moisture has not been satisfactorily solved. According to my invention, without losing the flexibility of the garment, I have devised a multi-layer garment which has long life and proper ventilation, together with a degree of warmth not heretofore known in cold weather garments. It is characteristic of garments made in accordance with my invention that a two layer plain knit fabric whose layers are interlocked by special stitches is provided next to the skin of the wearer, a porous foam rubber with restricted porosity is provided next in a thin layer, and an outer layer of [knit] fabric, preferably warp knit *fabric,* is provided next to the foam to assist the [weft] *two layer plain* knit fabric in protecting the foam against damaging extension. The *several layers are* [whole fabric is] united by quilting or as described below.

In the drawings Fig. 1 is a general front view of a cold weather jacket made of my novel fabric.

Fig. 2 is a similar view of a pair of trousers to match the jacket of Fig. 1, the lower end of one leg being turned up to show the inside.

Fig. 3 is an enlarged view of a small portion of [the outer] warp knit *fabric which may be used for the production of the outer layer of the jacket and trousers shown in Figs. 1 and 2, respectively* [layer of the fabric of Fig. 2].

Fig. 4 is an enlarged view of a small portion of the inner bi-knit or two layer fabric *used for the production of the inner layer of the jacket and trousers shown in Figs. 1 and 2, respectively* [of the inside of the turned up leg of Fig. 2].

Figure 6:
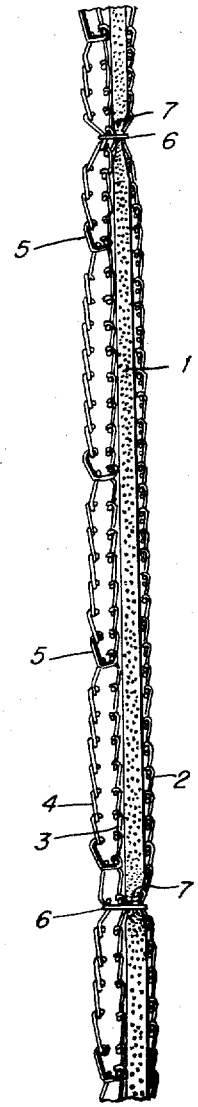

Fig. 6 *is an enlarged, vertical sectional view of a portion of the composite material used in the manufacture of any garment, and showing the relation of the several layers and the stitch structure employed to hold the several layers together* [is a diagram of the structure of the stitches of my garment viewed in vertical section].

Figure 7:
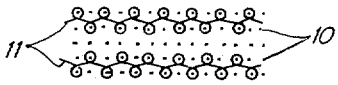

Fig. 7 is a warp knitting diagram of tricot knitting such as shown in Figs. 3 and 6.

In [knitted] garments for use in protection against cold weather, it is necessary to maintain flexibility in the garment regardless of whether it is being used as underwear or athletic outerwear. This has limited the ways in which cold weather garments can be constructed. It also tends to limit the total thickness of the material and the number of layers which the fabric can have. I have discovered that it is possible to produce a flexible garment by the use of four cooperative layers of fabric which, while they handle the situation of evaporation of perspiration and keep out the cold, at the same time have sufficient extensibility to take care of the movements of the wearer without damage to the garment.

The garment involves a coordination of a number of qualities built up around a thin sheath or layer of porous foam 1, either synthetic or rubber. I use a thin layer of this material spaced from both the outer face and the inner face of the garment. This material must be extensible and can, if desired, actually be resilient. It has porosity or interstices 7 in it which permit the passage of air containing moisture. However, the interstices are, in general, relatively small and may be at random so that the layer as a whole has a certain degree of air circulatory restriction. Material of this kind, when stretched or extended, becomes quite thin and if subjected to further pulling may tear, thus destroying the value of the foam at that point in the garment where the tear occurs. I therefore provide textile fabric on each side of the foam so constructed and attached to the foam as to provide a limit to the extensibility of the fabric as a whole. It is done in such a manner as not only to minimize the pull required to extend the garment within the limit of maximum stretch permitted, but also to contribute toward a novel breathing combination.

I will first explain the construction as far as concerns protecting the foam against damage due to over-extension. It is known that the extensibility qualities of warp knit and weft knit fabric are not the same. However, I have found that warp knit fabrics, particularly those of the closed as distinguished from the open type, can be coordinated with a certain type of known weft knit fabric to provide a balanced support for the purpose here in question.

"Closed" warp fabrics are those in which the adjacent wales are connected at successive "laps." "Open" warp fabrics are those in which the adjacent wales are connected only at intervals. The type of warp fabric which I find preferred for this outer layer is what is known as "tricot." Tricot is a double 1 x 1 warp in which the two warps lap in opposite directions. This fabric is not clearly distinguishable on cursory examination from the front from weft knit fabric. Here the wales and laps appear straight and at right angles to each other. However, from the back it can be seen that there are inclined stitches in the laps. I have therefore shown a view of the back of the fabric in the drawings to make it perfectly clear that we are using warp knit tricot in the outside layer of the garment in the preferred embodiment. It is immaterial, for the purposes of my invention, whether the face or back of the warp fabric is placed on the outer face of the garment. The fabric on the inside of the foam layer is peculiarly well suited to all the cooperative functions which it must perform in my novel garment. Fundamentally, by itself, it is the so-called bi-knit fabric of the Bellis U. S. Patent No. 709,734. It consists of two independent Jersey or plain fabrics, 3, 4 as distinguished from rib fabrics, tied across by stitches 5 spaced at intervals both walewise and coursewise. The stitches 5 interlock the two fabrics together. In this figure, the strand from which these tie-in or interlock stitches come in is shown cross-hatched for clarity. The interlock stitches 5 tend to hold the two fabrics rather closely and put a limit on the lateral movement of one layer with relation to the other. In the drawings the interlocked stitches are eight stitches apart in the walewise direction and twelve stitches apart in the coursewise direction, but it should be understood that this general relationship does not need to be adhered to in order to get most of the advantages of the invention.

In the drawings I have shown all four layers united by quilting. It will be seen that the quilting lines are greater distances apart than the interlocked stitches except where those quilting lines cross. As a result each diamond-shaped area enclosed by the quilting 6 is larger than the area encompassed by any four adjacent interlocked stitches forming an oblong in the fabric.

The quilting serves to put a limit on the amount of extension of the fabric but in addition the *inner and outer fabric layers* [two knitted fabrics] are in close contact with the foam and also tend to prevent the foam extending too far. In other words, when the *inner and outer fabric layers* [knitted fabrics] reach their limit of extension the foam cannot be pulled out further. The warp knit fabric with its inclined laps 9 has a rather limited extensibility and the bi-knit fabric not only has less extensibility than a rib fabric but also has a strengthened cushioned limit to its extensibility, due to the interlocked stitches, which provides a valuable manner of halting the extension of the fabric before the foam becomes torn.

Figure 5:
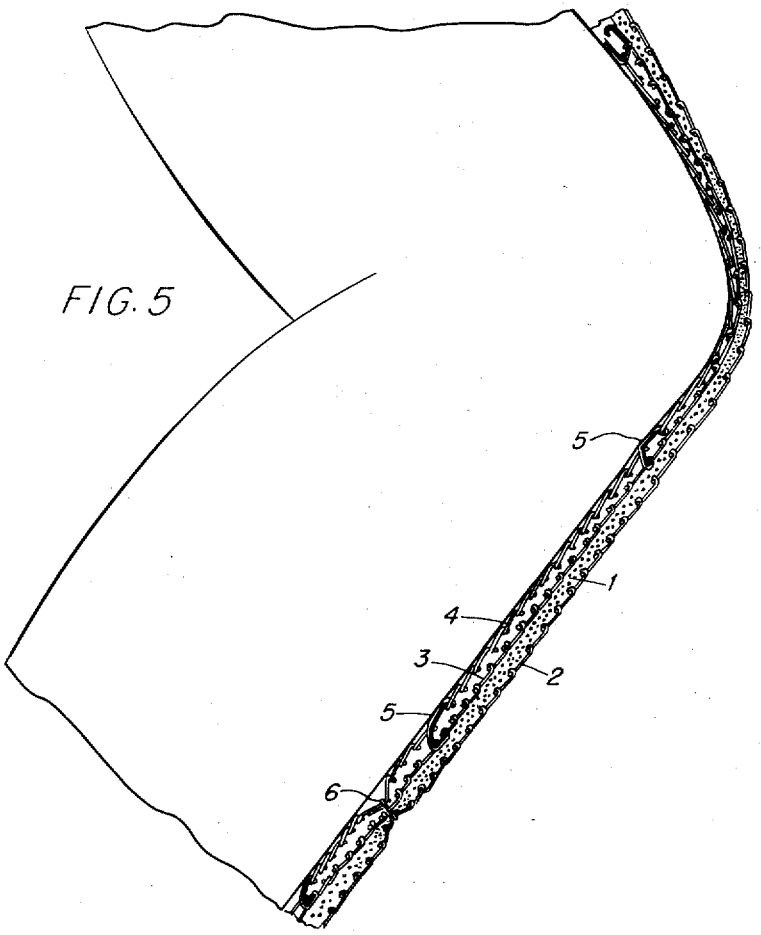
Fig. 5 is a view in diagrammatic vertical cross-section through all four layers of an arm of my garment of Fig. 1 when the wearer's elbow is bent.

As previously mentioned, it is highly desirable that the garment be able to stretch easily when responding to the movements of the wearer. As already explained, the two [knitted] fabrics on opposite sides of the foam layer both have qualities resistive to extensibility. I have found it desirable to have the resistance of the warp knit or outer layer 2 substantially equal to the resistance to extension of the bi-knit fabric 3, 4. By dividing the resistance equally, the maximum pull needed is kept to the minimum. I have also found that having a bi-knit fabric 3, 4 enables me to obtain a resistance which can be adjusted, within limits, to the resistance to stretch of the outer warp layer by adjusting the sizes of the stitches, the length of the interlock stitches, etc. To illustrate what is meant by tricot, I have shown, in Fig. 7 a diagram of the interlacing of the yarns and the needles in a tricot knitting machine. It will be seen that there are two warps and that the lap in each case is one over and one back with the lap of one warp being in the direction opposite to the lap of the other warp at any given moment. It will also be seen that each needle 10 has a yarn 11 wrapped around it on each warp movement. This is the standard 2-warp plain tricot construction. It might be understood, however, that it is possible to carry out my invention by using only one warp producing a 1 x 1 plain warp which is what might be termed the basic stitch for closed warp fabrics. Other fabrics can be used for the outer fabric provided their maximum stretch and their resistance to extensibility match those qualities in the bi-knit fabric so as to minimize the resistance to extensibility of the garment as a whole. It will be seen from Fig. 5 that when the fabric is extended by being pressed outwardly, as for instance by an elbow, that the foam layer 1 tends to become thinner. It is the stretching of the foam layer until it becomes so thin and breaks which is one danger that I am seeking to avoid by preventing over-extension of the fabric. It will be seen that the interlock stitches in this figure are drawn or pulled out to an angle due to the fact that the cotton layer of the fabric is stretched further than the wool or wool blend layer. In this case the interlock stitches coordinate the resistance of the two plain weft knit layers 3, 4. Thus the bi-knit fabric consisting of layers 3, 4 cooperates in protecting the foam without exposing the fabric to the extensibility which would be found in rib fabric and at the same time tends to check the extension gradually but firmly when the limit is reached.

It has also been found that establishing a definite maximum extension for the garment assists in producing a garment with good protection against cold for another reason.

As the foam layer of the garment is stretched, it not only becomes thinner but also closes up the interstices or air spaces and there is a point beyond which the extension of the fabric completely eliminates the air pockets or interstices. It will be seen that with the air pockets or interstices completely missing from the foam, the resistance to cold of the garment is very much reduced. It is proper to say that the flattening of the Curon or other foam material beyond a certain point suddenly reduces the value of the garment in preventing the passage of cold. Therefore, setting a limit to the stretchability insures that the garment will not lose its resistance to cold.

Coordinated with this protection of the foam is the double air pocket and ventilation function which I will now describe.

The [Duofold] two layer *bi-knit* fabric which constitutes layers 3, 4 of the fabric of my novel garment is customarily made with cotton in the layer next to the wearer and a layer containing some wool, either all wool or wool blend for the outer layer. It has been found that in my novel garment this [Duofold] *bi-knit* 2-layer fabric forms part of a very valuable sequence of effects for a cold weather garment. Any perspiration will be picked up by the cotton as usual and the perspiration thus absorbed is passed on by capillary action to the wool layer 3 of the bi-knit fabric. At this point the air movements evaporate the moisture as it passes into the interstices of the foam. This means that the evaporation takes place out of contact with the skin of the wearer. This result of the porosity of the foam 2 in combination with the air pockets in the [Duofold] *bi-knit* fabric 3, 4 is of great importance because it is a cooling operation and by having it take place out of contact with the surface of the skin of the wearer, the garment is much warmer to the wearer than would otherwise be the case. Incidentally, it is believed that to some extent evaporation actually takes place in the foam itself.

There is another aspect of the air pocket situation to which attention should be called. It will be seen in the first place, that the quilting serves to prevent movements of air away from or to large areas, thus localizing transfers and making it easier for the fabric to resume its normal structure if, for any reason, it has become flattened and the air partly squeezed out. In my fabric, however, there are additional respects in which the adjustments necessary to take care of the wearer's movements can be localized as far as concerns air pockets. In addition to the large scale prevention of air movement caused by quilting, it should be noted that the air pockets between layers 3, 4 of the [Duofold] *bi-knit* fabric do not close or flatten as soon as the interstices in the foam. Thus when the movements of the wearer extend the foam, it has the effect, first, of closing in the exit of air from pockets in the [Duofold] *bi-knit* fabric and thus preventing escape of air to the outside. Furthermore, the interlock stitches tending to hold the plain knit layers 3, 4 somewhat closely together form pillows any one of which would extend, say, 12 stitches in a coursewise direction and 8 stitches in a walewise direction. This restricts the movement of air tending to maintain it in its original pillow. As already explained, these pillows are considerably smaller than the area restricted by the quilting, thus providing a restriction on a finer scale to cooperate with the quilting restriction. Again, the foam has interstices which, to some extent, are smaller and less frequent than the stitches in layers 3, 4 so that restriction of circulation in the foam is greater than between layers 3, 4 when one gets down to the size of the individual stitches or interstices. It will be seen, therefore, that while we have a garment in which there are large air pockets between layers 3, 4, I not only provide means specially restricting the breathing through the fabric when it is stretched and made thinner, but I have transferred the evaporation function away from the skin of the wearer, thus adding to the warmth value of the garment.

The embodiment of the invention heretofore described makes use of quilting to hold the textile layers to the foam. In certain instances, however, such for instance as when the invention is being used as an outermost garment, quilting may be undesirable in appearance. I find that a garment having a more sleek appearance than a quilted one and yet one which will have substantially all of the advantages of the quilted embodiment, can be obtained by causing laminar adhesion between the outermost textile fabric 2 and the foam 1 and between the layer 3 of the bi-knit fabric adjacent the foam, and the foam itself. It is not necessary to have adhesion between the layers 3 and 4. The adhesion is an effect obtained by the use of adhesives or proper application of heat, etc. It is done in such a way as to maintain porosity. By thus causing the garments to adhere without in any way interfering with the porosity, the garment can breathe in the same way as in the quilted embodiment. It is true that the quilted embodiment adds an extra size of air pockets to the garment but that large size air pocket is not always needed. The laminar embodiment has the advantage of a sleek appearance, more frequent support to the foam, and a slightly different breathing function which may be useful under certain circumstances. It also is slightly thinner than the quilted form.

I prefer to use a yarn such as nylon for the outer surface of my garment because it provides a slick and abrasion resistant surface which makes the garment easy to put on and take off. It does not snag, etc. Orlon could also be used. While many types of porous extensible foam could be used, I prefer the urethane foams, such, for example, as Curon or Scottfoam. It will be noted that the garment can breathe through from one side to the other when not stretched.

What is claimed is:

1. A cold weather multi-layer knitted garment comprising a layer of knitted fabric forming the outer layer of the garment, and a layer of porous extensible foam next to the outer layer, in combination with two weft plain knit layers, one next to the inner face of the foam and the other forming the inner face of the garment, said two weft plain knit layers being held together by spaced interlocked stitches forming a bi-knit fabric with air spaces therein, all layers being held together; whereby moisture evaporation takes place out of contact with the wearer.

2. A cold weather multi-layer knitted garment according to claim 1 in which the outer layer is composed of closed warp fabric having a maximum extensibility substantially equal to that of the bi-knit fabric and which is less than the extensibility of the foam at which it is liable to tear; whereby the foam is protected on both sides from damage due to overextension.

3. A cold weather multi-layer knitted garment according to claim 1 in which the interstices in the foam are smaller than the air spaces between the weft knit layers; whereby the first stretching of the garment tends to close the interstices and prevents loss of the warm air in the bi-knit air spaces.

4. A cold weather multi-layer knitted garment comprising an outer layer of closed warp knit fabric, a layer of porous extensible foam next to the warp knit layer and a two layer weft plain knit fabric on the inner face of the foam, the two layers of the plain knit weft fabric being united at frequent intervals spaced walewise and coursewise by stitches interlocked with a stitch of the opposite layer, the layer adjacent the foam having at least some wool in it and the inner face of the garment having cotton; the wales in all three knitted layers of the garment running vertically and all four layers being united by quilting which embraces a larger area than any adjacent interlock stitches; whereby moisture evaporation takes place out of contact with the skin of the wearer and the extensibility of the garment is restricted, thus preventing damage to the foam and extinguishment of the [bi-knit] air spaces *in the two layer knit fabric.*

5. A cold weather multi-layer knitted garment comprising a thin layer of extensible Curon having small random interstices therethrough, and a layer of closed warp nylon fabric forming a slick and abrasion resistant outer surface, the layer being next to the Curon layer, in combination with bi-knit fabric consisting of a layer of plain weft knit fabric containing at least some wool and a layer of cotton plain weft knit fabric held together by interlocked stitches at spaced wales and courses to form air spaces between the layers of bi-knit fabric of much larger dimensions than the Curon interstices, and all four layers united by quilting at spacing larger than the bi-knit air spaces; the resistance to stretch being substantially evenly divided between the warp knit layer and the two bi-knit layers taken together; and there being no unknit yarn in the knitted layers other than the quilting yarn; whereby the garment when unstretched can breathe from one side to the other and the Curon is equally protected against damage from overstretch on both sides while resistance to stretch is minimized up to the point of danger from overstretch.

*6. A cold weather multi-layer garment comprising a layer of fabric forming the outer layer of the garment, and a layer of porous extensible foam next to the outer layer, in combination with two weft plain knit layers, one next to the inner face of the foam and the other forming the inner face of the garment, said two weft plain knit layers being held together by spaced interlocked stitches forming a bi-knit fabric with air spaces therein, all layers being held together; whereby moisture evaporation takes place out of contact with the wearer.*

*7. A cold weather multi-knit garment according to claim 6 in which the interstices in the foam are smaller than the air spaces between the weft knit layers; whereby the first stretching of the garment tends to close the interstices and prevents loss of the warm air in the bi-knit air spaces.*

*8. A cold weather multi-layer garment comprising an outer layer of fabric, a layer of porous extensible foam next to said outer layer and a two layer weft plain knit fabric on the inner face of the foam, the two layers of the plain knit weft fabric being united at frequent intervals spaced walewise and coursewise by stitches interlocked with a stitch of the opposite layer forming air spaces in the bi-knit fabric, the layer of said plain knit weft fabric adjacent the foam having at least some wool in it and the other layer of said plain knit weft fabric having cotton in it; the wales in all knitted layers of fabric running vertically and all four layers being united by quilting which embraces a larger area than any adjacent interlocked stitches; whereby moisture evaporation takes place out of contact with the skin of the wearer and the extensibility of the garment is restricted, thus preventing*

*damage to the foam and extinguishment of the air spaces in the bi-knit fabric.*

References Cited in the file of this patent or the original patent

UNITED STATES PATENTS

| | | |
|---|---|---|
| 709,734 | Bellis | Sept. 23, 1902 |
| 2,230,723 | Maclachlan | Feb. 4, 1941 |
| 2,290,166 | Craig et al. | July 21, 1942 |
| 2,305,605 | Craig et al. | Dec. 22, 1942 |

| | | |
|---|---|---|
| 2,338,945 | Just et al. | Jan. 11, 1944 |
| 2,372,497 | Johnson et al. | Mar. 27, 1945 |
| 2,688,751 | Kermode | Sept. 14, 1954 |
| 2,749,551 | Garbellano | June 12, 1956 |
| 2,755,535 | Schoenberger | July 24, 1956 |
| 2,788,804 | Larkin | Apr. 16, 1957 |

FOREIGN PATENTS

| | | |
|---|---|---|
| 202,381 | Australia | July 5, 1956 |
| 979,205 | France | Dec. 6, 1950 |